United States Patent

Narumiya et al.

[11] Patent Number: 4,765,833
[45] Date of Patent: Aug. 23, 1988

[54] POROUS CERAMIC STRUCTURE AND METHOD OF FILTERING ALUMINUM

[75] Inventors: Tsuneaki Narumiya, Kanagawa; Tomio Oyachi, Tokorozawa; Yasuhiro Iino, Kodaira, all of Japan

[73] Assignee: Bridgestone Corporation, Tokyo, Japan

[21] Appl. No.: 796,266

[22] Filed: Nov. 8, 1985

[30] Foreign Application Priority Data

Nov. 8, 1984 [JP] Japan .................. 59-235737

[51] Int. Cl.$^4$ .................................. C22B 21/06
[52] U.S. Cl. .................. 75/68 R; 210/510.1; 266/227
[58] Field of Search ............ 266/227; 210/510.1; 75/93 R, 68 R

[56] References Cited

U.S. PATENT DOCUMENTS

| 3,006,473 | 10/1961 | Gamber | 75/68 R |
| 4,395,333 | 7/1983 | Groteke | 210/510.1 |
| 4,528,099 | 7/1985 | Rieger et al. | 210/510.1 |

*Primary Examiner*—Melvyn J. Andrews
*Attorney, Agent, or Firm*—Birch, Stewart, Kolasch & Birch

[57] ABSTRACT

A porous ceramic structure suitable for use as a filter for molten metal, in which a porous ceramic body having pores capable of passing a fluid therethrough is covered with a metal layer over the wall surface of the pores such that a fluid may flow through the pores while in contact with the metal layer. The filtering efficiency can be improved due to the increased wettability between the ceramic filter and the molten metal.

9 Claims, 1 Drawing Sheet

POROUS CERAMIC STRUCTURE AND METHOD OF FILTERING ALUMINUM

BACKGROUND OF THE INVENTION

1. Field of the Invention

This invention concerns a porous ceramic structure having a good wettability with molten metal and thus suitable for use as a filter for molten metal.

2. Description of the Prior Art

Demands for aluminum products such as aluminum cans for drinks and aluminum foils for packaging use, as well as copper wires for use in electrical conduction wires have been increased more and more in recent years. Since pin holes, wire disconnections or like other defects are resulted in such aluminum or copper products if solid impurities are present in the ingots for producing them, various attempts have been made for obtaining the purified ingots having no solid impurities.

Such the ingots are produced from the purified molten fresh metal obtained by filtering the molten fresh metal to remove solid impurities therefrom. Conventionally, as the filter for molten metal, alumina balls of several millimeter diameter or sinters of alumina particles have hitherto be used for filtering out the impurities by passing the molten metal therethrough.

In order to further improve the filter for molten metal, the present applicant has already proposed porous ceramic filters as described in Japanese patent publications Nos. 35047/1982, 35048/1982, 35049/1982 and 13887/1984, which have already been put to practical use generally in the field of metal material production.

Although the above proposed ceramic filters have been appreciated as filters of high industrial value and the demand therefor has increased, the filters made from ceramic are generally poor in wettability between the ceramics and the molten metal and, accordingly, they involve the following problems, for which effective solutions are required:

(1) They require a long period of time from the introduction of a molten metal at the inlet of the filter to the start of the actual filtration of the molten metal, as well as a large initial head.

(2) They cause a localized flow of the molten metal inside of the filter to hinder the effective utilization for the entire region of the filter, as well as give a high flow resistance to the molten metals to reduce the filtering rate and the processing amount of the molten metal, resulting in reduction in the durability.

SUMMARY OF THE INVENTION

Therefore, it is an object of this invention to provide a porous ceramic structure having an excellent wettability with molten metal and hence suitable for use as a filter for molten metal.

In order to solve the above-mentioned drawbacks, the present inventors have made an earnest study on the filter for molten metal. As a result, they have achieved this invention on the findings that a porous ceramic body having pores capable of passing a fluid therethrough has a good wettability with molten metal in a case where a metal layer is formed over the wall surface of the pores thereof and, accordingly, that a porous ceramic structure having a metal layer formed over the wall surface of the pores capable of passing the fluid therethrough can suitably be used as the filter for molten metal and can filter the molten metal with high workability and efficiency, as well as exhibit an excellent durability.

According to the present invention, there is provided a porous ceramic structure suitable for use as a filter for molten metal comprising a porous ceramic body having pores capable of passing a fluid therethrough, characterized in that a metal layer is covered over the wall surface of the pores such that a fluid may flow through the pores while in contact with the metal layer.

Since the metal layer is deposited to cover the entire wall surface of the pores of the porous ceramic structure capable of passing a fluid therethrough in accordance with this invention, the affinity or the wettability with the molten metal when it flows through the pores is significantly improved and, accordingly, the porous ceramic structure can suitably be used as the filter for molten metal. Specifically, in the case of using the porous ceramic structure according to this invention as the filter for molten metal such as molten aluminum and, since the surface of the ceramic structure in contact with the molten metal is composed of metal as described above, the affinity or the wettability with the molten metal is extremely increased as compared with the conventional case where the molten metal is in direct contact with the ceramic. As a result, the flow resistance of the molten metal when it passes through the pores of the filter (porous ceramic structure of the invention) is extremely reduced and, accordingly, the time from the introduction of the molten metal at the inlet of the filter material to the start of the filtration can significantly be reduced and the filtration can be started sufficiently even if the initial head pressure is reduced. Further, localized flow of the molten metal inside the filter is eliminated due to the improvement in the wettability. Thus, with the synergistic effect between the increase in the effective passing area of the filter and the reduction in the flow resistance to the molten metal, the running head can be decreased, together with the shortening of the filtration time and increase in the processing amount for the molten metal per filter, to thereby significantly improve the durability. The ceramic structure according to this invention can suitably be used particularly in recently demanded cases where the ceramic filter with a reduced average pore diameter is used for the requirement of high quality metal material with a lowered impurity content.

DESCRIPTION OF THE ACCOMPANYING DRAWINGS

These and other objects, features, as well as advantages of this invention will be made clearer by the following descriptions referring to the accompanying drawings, wherein FIG. 1 is a perspective view illustrating one embodiment according to this invention;

DETAILED DESCRIPTION OF THE PREFERRED EMBODIMENTS

The feature of this invention resides in a porous ceramic structure used particularly as a filter for molten metal, in which a porous ceramic body having pores capable of passing a fluid therethrough is covered with a metal layer over the wall surface of the pores such that a fluid may flow through the pores while in contact with the metal layer.

The porous ceramic body can include alumina balls or sinters of ceramic particles, porous ceramic body of a reticulated cell structure having three dimensional interconnected open cells (ceramic foams) and the like, with the ceramic forms being preferably used as the filter material for molten metal.

The porous ceramic structure using the ceramic foam will now be explained while referring to the accompanying drawings.

Figure 1:
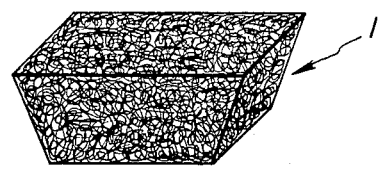
Figure 2:
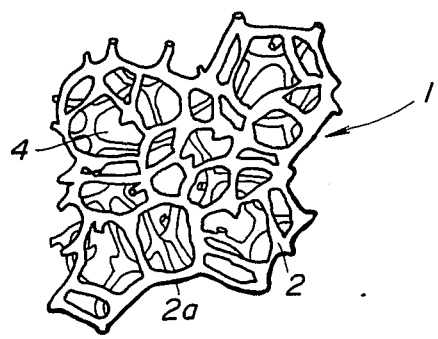
FIG. 2 is an enlarged side elevational view for a portion of the ceramic foam in the above embodiment.
Figure 3:
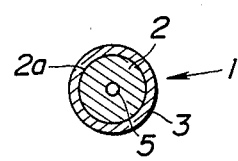
FIG. 3 is an enlarged cross sectional view for the lattice of the above-mentioned embodiment.

FIG. 1 shows a schematic view of a porous ceramic structure 1 that can be used as a filter for molten metal such as aluminum, copper and iron. The ceramic structure 1 comprises a porous ceramic body (ceramic foam) 2 prepared by applying a ceramic slurry onto cell membrane-free reticulate flexible polyurethane foam as a substrate and then carbonizing to eliminate the polyurethane foam through sintering, and a metal layer 3 coated to cover the entire surface of the skelton lattice 2a of the porous ceramic body 2. The porous ceramic body 2 has the three dimensional interconnected open cells 4 having substantialy the same cell structure of the reticulate polyurethane foam. Continuous cavities 5 are foamed to the inside of the skeleton 2a corresponding to the polyurethane foam substrate. The open cells 4 constitute the passage for the molten metal. The shape of the porous ceramic structure embodied into a frust conical post as shown in FIG. 1 may properly be varied. Further, the open cells 4 in the porous ceramic body 2 is desirably formed in any of the directions with no substantial clogging.

In the case of using the porous ceramic structure mainly made of the porous ceramic body described above as a molten metal filter, the apparent specific gravity of the porous ceramic body is desirably from 0.3 to 0.6, by which a porous ceramic structure with great mechanical and thermal strength can be obtained at a high sufficiency quality to withstand the use as the filter for molten metal at high temperature. It is further desired for the porous ceramic structure mainly composed of the porous ceramic body that the three dimensional interconnected open cells have an average diameter from 0.3 to 5 mm after forming the metal layer and they are formed as showing no substantial cloggings in any of the directions and that a pressure loss is from 0.3 to 30 mmAq for passing through 1 cm thickness at the wind flow rate of 1 m/sec, whereby the molten metal causes vigorous self-stirring and becomes into contact with the metal layer effectively, resulting in the efficiently simultaneous removal of soluble impurities and solid impurities from the molten metal. Furthermore, a filter having a moderate filtering rate and an adequate strength can be obtained by defining the porosity of the porous ceramic structure as from 75 to 95%.

In this invention, the porous ceramic structure preferably includes those materials mainly composed of silica, alumina and magnesia which are sintered at a temperature of higher than 1300° C. and have a softening point of higher than 1250° C., cordierite ceramic being particularly preferred. The porous ceramic structure made of ceramics of the above-mentioned type can sufficiently withstand the thermal shocks upon pre-heating the porous ceramic structure to a temperature nearly to that of the molten metal to be filtered therethrough and withstand the thermal shocks during filtering operation for the molten metal.

In the porous ceramic structure according to this invention, the porous ceramic body such as ceramic foam is formed, at the wall surface of the pores thereof capable of passing a fluid therethrough (for example, at the surface of the skelton lattice in the case of the ceramic foam), with a metal layer such that the fluid flows therethrough while being in contact with the metal layer. In this case, there is no particular restriction for the kinds of metals forming the metal layer and they may properly be selected depending on the purpose of uses. In the case of using the porous ceramic structure as the filter for molten metal, it is preferred to use those metals as not imparing, even if incorporated in a slight amount, the performance required for the molten metal to be filtered and those metals having higher melting point than that of the molten metal to be filtrated. In the case where the molten metal to be filtrated is aluminum, copper or iron, the coating metal layer is preferably selected from platinum, gold, silver, copper, tin, brass, bronze and nickel. By using these metals depending on the molten metals to be filtrated, reduction in the quality of the filtrated molten metals due to the leaching of the soluble metal impurities therein can be minimized.

Further, while there is also no particular restriction for the thickness of the metal layer, it is preferably from 0.05 to 30 $\mu$m and, particularly, from 0.1 to 10 $\mu$m. If the thickness of the coating metal layer is less than 0.05 $\mu$m, no sufficient improvement can be obtained for the filtrating efficiency. While on the other hand, if the thickness is greater than 30 $\mu$m, it merely increases the material cost, with no corresponding merit.

For forming the metal layer to the porous ceramic body, electroless plating can preferably be adopted. In the case of forming the metal layer through the electroless plating, plating can be applied in accordance with an ordinary method. For instance, after optionally degreasing and/or etching a porous ceramic body with a chemical or physical method, the ceramic body can be applied with an activating treatment for depositing a catalyst metal such as a metal palladium and then subjected to electroless plating (such as electroless copper, nickel, silver or gold plating, etc.). Alternatively, electroplating may be applied after electroless plating or like other electrification treatment has been conducted. Furthermore, although the metal layer can also be formed through the metal sintering process, the use of the plating process is preferred.

Figure 4:
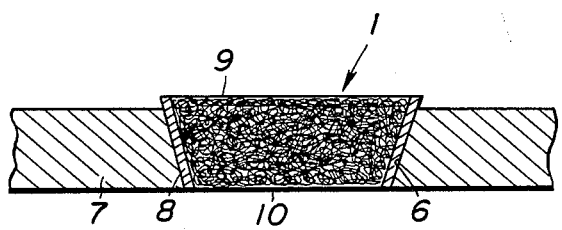
FIG. 4 is a longitudinal cross sectional view for illustrating the state of using the above-mentioned embodiment as a filter for molten metal.

In the case of using the porous ceramic structure having thus been constituted as a filter for molten metal as shown in FIG. 4, the outer surface of the ceramic structure 1 is covered with a ceramic sheet 6 or the like, which is then fitted into an aperture 8 of the support 7 and, a molten metal is caused to flow from the upper surface 9 into the interconnected open cells of the porous ceramic structure 1. In this way, soluble impurities and incorporated solid impurities are filtered out during passage of the molten metal through the interconnected open cells and then the purified molten metal is issued from the lower surface 10. In this case, it is also possible to flow the molten metal from the lower to the upper surface by applying a head pressure.

Since the metal layer is deposited to cover the entire wall surface of the pores of the porous ceramic structure capable of passing a fluid therethrough, the flow resistance to the molten metal is reduced when the molten metal passes through the pores of filter. Accordingly, the time from the introduction of the molten metal at the inlet of the filter to the start of the filtration can significantly be reduced and the filtration can be started sufficiently even if the initial head pressure is reduced. Moreover, localized flow of the molten metal inside the filter is eliminated due to the improvement in the wettability.

This invention will further be explained more specifically referring to Examples and Comparative Examples, but this invention is in no way restricted to the following Examples.

EXAMPLES, COMPARATIVE EXAMPLES

Reticulate flexible polyurethane foams with no cell membranes of a frust conical post(A) having an upper square surface with a 430 mm side, a lower square surface with a 398 mm side and a 50 mm thickness, and of a frust conical post(B) having an upper square surface with a 585 mm side, a lower square surface with a 553 mm side and 50 mm thickness were prepared each by two.

A powder material made of 50 parts by weight of cordierite and 50 parts by weight of alumina were mixed and stirred well together with a liquid composed of a binder and water in 2:1 ratio to prepare a ceramic slurry. The polyurethane foams were impregnated with the slurry and, after removing the excess slurry, dried at 70° C. for 24 hours. The polyurethane foams coated with the ceramic slurry obtained in this way were sintered at a temperature higher than about 1300° C. to prepare porous ceramic foams.

To one of each the porous ceramic foams (A) and (B) was applied an electroless copper plating (using "chemical copper; new #100" (trade name) as a plating bath, manufactured by Okuno Seiyaku Kogyo K.K. in Japan), to prepare a specimen in which the surface of the porous ceramic lattice was covered with metal copper of about 1 μm thickness. The other were porous ceramic foams (A) and (B) was left as they were with no copper plating and used as a comparative specimen. The physical properties of the thus obtained specimens are shown in Table 1.

TABLE 1

| Sample No. | Example | | Comparative Example | |
|---|---|---|---|---|
| | 1 | 2 | 3 | 4 |
| Average diameter of interconnected open cells (mm) | 0.8 | 1.0 | 0.8 | 1.0 |
| Pressure loss at wind velocity of 1 m/sec. (mmAq/cm) | 12 | 8 | 12 | 8 |
| Porosity | 87.6 | 87.6 | 87.6 | 87.6 |
| Apparent specific gravity | 0.35 | 0.35 | 0.35 | 0.35 |
| Thickness for copper coating layer (μm) | 0.9 | 1.1 | 0 | 0 |
| Sample size | A | B | A | B |

The porous ceramic foams coated with metal copper as the Example and porous ceramic foams not coated with metal copper as the Comparative Example were set horizontally to filter boxes, through which magnesium type molten aluminum was filtrated under the working conditions of a chamber temperature of 800° C., a molten metal temperature of 750° C. and an initial head of 170 kg. The time required till the start of the filtration and the content of the copper impurity (% by weight) leached out into the molten aluminum are shown in Table 2.

TABLE 2

| Sample No. | Example | | Comparative Example | |
|---|---|---|---|---|
| | 1 | 2 | 3 | 4 |
| Required time till the start of the filtration (min) | 1-2 | less than 1 | 30-40 | 20-25 |
| Impurity copper content (%) | 0.14 | 0.14 | 0.14 | 0.14 |
| Initial head | 300 | 300 | 20 | 10 |

As apparent from the results in Table 2, the porous ceramic foam covered with the metal layer according to this invention has an extremely high filtering efficiency for the molten metal and there was no increase caused by the impurities due to the coated metal layer.

What is claimed is:

1. A porous ceramic structure suitable for use as a filter for molten aluminum comprising a porous ceramic body having pores capable of passing the molten aluminum therethrough, and a formed, plated copper layer, having a melting point higher than that of the molten aluminum to be filtered, covering the entire surface of said pores such that said molten aluminum may flow through said pores while in contact with said formed, plated copper layer without melting said copper layer.

2. The structure as defined in claim 1, wherein the thickness of said formed plated copper layer is from 0.05 to 30 μm.

3. The structure as defined in claim 1 wherein said copper layer is formed by electroless plating.

4. The structure as defined in claim 1 wherein copper layer is formed by electroless plating, followed by electroplating.

5. The structure as defined in claim 1, wherein said porous ceramic body comprises a ceramic foam of a reticulate cell structure having three-dimensional interconnected open cells, and said formed, plated copper layer is formed covering the surface of the skeleton lattice.

6. The structure as defined in claim 5, wherein the ceramic porous foam has an apparent specific gravity of from 0.3 to 0.6, the average diameter of an interconnected open cells of from 0.3 to 5 mm after forming said formed plated copper layer on the surface of the skeleton lattice thereof, a pressure loss of from 0.3 to 30 mmAq for passing through the 1 cm thickness at the wind flow rate of 1 m per sec, and a porosity of from 75 to 90%.

7. The structure as defined in claim 5 wherein said porous ceramic foam is prepared by applying a ceramic slurry to a cell membrane free reticulate flexible polyurethane foam and then sintering the same.

8. The structure as defined in claim 5, wherein said material for said porous ceramic foam is cordierite material.

9. A method for filtering molten aluminum which comprises passing said molten aluminum through the porous ceramic structure of claim 1.

* * * * *